US011426954B2

(12) United States Patent
Kubo et al.

(10) Patent No.: US 11,426,954 B2
(45) Date of Patent: Aug. 30, 2022

(54) FIBER REINFORCED RESIN MOLDED ARTICLE AND METHOD OF MANUFACTURING THE SAME

(71) Applicant: HONDA MOTOR CO., LTD., Tokyo (JP)

(72) Inventors: Takashi Kubo, Wako (JP); Yoshihide Yuza, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/551,777

(22) Filed: Aug. 27, 2019

(65) Prior Publication Data

US 2020/0070439 A1    Mar. 5, 2020

(30) Foreign Application Priority Data

Aug. 31, 2018  (JP) .............................. JP2018-162331

(51) Int. Cl.
*B29B 15/12* (2006.01)
*B29B 11/16* (2006.01)
*B29C 70/40* (2006.01)

(52) U.S. Cl.
CPC .............. *B29C 70/40* (2013.01); *B29B 11/16* (2013.01); *B29B 15/12* (2013.01); *Y10T 428/24994* (2015.04); *Y10T 428/249948* (2015.04)

(58) Field of Classification Search
CPC ... Y10T 428/24994; Y10T 428/249948; Y10T 428/249955; Y10T 428/24996; Y10T 428/249971; Y10T 428/249986; B32B 2260/021; B32B 5/26; B32B 27/12
See application file for complete search history.

(56) References Cited

U.S. PATENT DOCUMENTS

| | | | |
|---|---|---|---|
| 4,755,904 A * | 7/1988 | Brick | F16B 5/04 244/1 A |
| 5,079,055 A * | 1/1992 | Doyle | B29C 70/24 411/427 |
| 7,070,725 B2 * | 7/2006 | Mathew | B29C 45/14795 264/254 |
| 7,914,882 B2 | 3/2011 | Erb et al. | |
| 8,771,452 B2 | 7/2014 | Kitagawa | |
| 9,695,712 B2 * | 7/2017 | Otsu | F02C 7/32 |
| 2005/0077643 A1 | 4/2005 | Matsuoka | |
| 2010/0158676 A1 | 6/2010 | Bottome | |

(Continued)

FOREIGN PATENT DOCUMENTS

| | | |
|---|---|---|
| DE | 102015201348 | 7/2016 |
| JP | 2007-168397 | 7/2007 |

(Continued)

OTHER PUBLICATIONS

German Office Action and Search Report for German Patent Application No. 102019212983.8 dated May 12, 2020.

(Continued)

*Primary Examiner* — Alicia J Sawdon
(74) *Attorney, Agent, or Firm* — Amin, Turocy & Watson, LLP

(57) ABSTRACT

A fiber reinforced resin molded article includes a fiber reinforced resin layer, and a functional site made up from a resin layer for molding that does not contain reinforcing fibers. An insert member is retained in an integrated manner in the functional site.

5 Claims, 19 Drawing Sheets

(56) References Cited

U.S. PATENT DOCUMENTS

| | | | | |
|---|---|---|---|---|
| 2015/0275689 A1* | 10/2015 | Lussier | ................... | F02K 3/06 |
| | | | | 415/200 |
| 2016/0339630 A1* | 11/2016 | Ogawa | ................ | B29C 65/4835 |
| 2020/0055273 A1* | 2/2020 | Hamada | ................... | B26F 1/12 |

FOREIGN PATENT DOCUMENTS

| | | |
|---|---|---|
| JP | 6084069 | 2/2017 |
| RU | 2353640 | 4/2009 |
| WO | 2012/026031 | 3/2012 |

OTHER PUBLICATIONS

Indian Office Action for Indian Patent Application No. 201914034602 dated Jan. 7, 2021.
Japanese Office Action for Japanese Patent Application No. 2018-162331 dated Aug. 17, 2021.

* cited by examiner

FIBER REINFORCED RESIN MOLDED ARTICLE AND METHOD OF MANUFACTURING THE SAME

CROSS-REFERENCE TO RELATED APPLICATION

This application is based upon and claims the benefit of priority from Japanese Patent Application No. 2018-162331 filed on Aug. 31, 2018, the contents of which are incorporated herein by reference.

BACKGROUND OF THE INVENTION

Field of the Invention

The present invention relates to a fiber reinforced resin molded article having a fiber reinforced resin layer made up from a fiber reinforced resin containing reinforcing fibers, as well as to a method of manufacturing the same.

Description of the Related Art

A method of obtaining a fiber reinforced resin molded article is known wherein a stacked body, in which sheet-shaped reinforcing fibers and a sheet-shaped resin are stacked, is subjected to applied pressure molding by a heated press molding die (for example, see Japanese Patent No. 6084069). In this case, since the molded article does not pass through a prepreg stage, there is an advantage in that the fiber reinforced resin molded article can be efficiently obtained in a short time period.

SUMMARY OF THE INVENTION

Incidentally, in the method of manufacturing the fiber reinforced resin molded article which is subjected to pressure by the heated press molding die, although it is generally suitable for molding an outer surface such as an exterior cover or the like, in molding a site that requires functionality such as a part that is attached or a part that is fitted to another member, in order to provide such an additional function to the fiber reinforced resin molded article that is obtained by applied pressure molding, so-called secondary processing must further be performed, such as performing resin molding in order to create the shape of the additional functional component by accommodating the resin molded article in a molding die of an injection molding machine, which complicates the manufacturing process. Further, since an injection molding apparatus is required, an increase in costs is incurred.

In addition, since the number of processing steps to obtain the shape of the final product is increased, an improvement in efficiency has been desired.

A principal object of the present invention is to provide a fiber reinforced resin molded article in which the support strength of an insert member disposed at a site requiring functionality is enhanced.

Another object of the present invention is to provide a method of manufacturing a fiber reinforced resin molded article by which the above-described fiber reinforced resin molded article can be easily obtained.

In order to achieve the aforementioned objects, according to one aspect of the present invention, a fiber reinforced resin molded article (10) is provided including a fiber reinforced resin layer (52) made up from a fiber reinforced resin in which reinforcing fibers (56) are impregnated with a resin, comprising the fiber reinforced resin layer (52), and a functional site (54) made up from a resin layer for molding (50) that does not contain the reinforcing fibers (56), wherein an insert member (44) is provided integrally in at least the functional site (54).

According to the present invention, the functional site is provided by the resin layer for molding, on which so-called build-up is carried out with respect to the fiber reinforced resin layer, and the insert member is provided integrally in the functional site. Since the functional site is made thicker, the support strength of the insert member is enhanced.

An end portion of the insert member (44) is preferably provided integrally in a state of being reinforced by the fiber reinforced resin layer (52). Because the insert member is kept in close contact with the fiber reinforced resin layer, the support strength of the insert member is further enhanced.

Further, an end portion of the insert member (44) is preferably surrounded by the resin layer for molding (50). Since the resin of the resin layer for molding surrounds the insert member while conforming to the insert member at the time that the functional site is molded, and undergoes hardening or solidification in this state, the insert member and the resin layer for molding are suitably joined together in a satisfactory manner. Therefore, the support strength of the insert member is further enhanced.

Furthermore, an insertion hole through which a fastening member (46) is passed is preferably disposed in the functional site (54), the insert member (44) being disposed on an inner circumference of the insertion hole, and preferably, the fastening member (46) is configured to be fastened with the insert member (44) while the fiber reinforced resin layer (52) is placed in facing relation to an end surface of the insert member (44) and a pressure applying surface of the fastening member (46). In this case, when a predetermined torque is applied to the fastening member, the fiber reinforced resin layer receives the pressure of the fastening member. Since the fiber reinforced resin layer is superior in strength, the occurrence of cracking or the like in the fiber reinforced resin molded article is avoided.

According to another aspect of the present invention, there is provided a method of manufacturing a fiber reinforced resin molded article (10) including a fiber reinforced resin layer (52) in which reinforcing fibers (56) are impregnated with a resin, comprising the steps of:

performing press molding in a state in which a resin for molding (82) is stacked locally on a stacked body of a sheet-shaped resin (80) and sheet-shaped reinforcing fibers (78), and is heated by a press molding die (60, 62); and placing an insert member (44) in a functional site molding location provided in a cavity (68);

wherein the insert member (44) is integrally molded while being embedded in at least the functional site (54) that is molded at the functional site molding location.

More specifically, according to the present invention, the functional site made up from the resin for molding can be obtained simultaneously with the other locations, by locally stacking the resin for molding that is used for forming the functional site, and carrying out heated press molding thereon. For this reason, a secondary process such as an injection process or the like is rendered unnecessary. By this amount, the manufacturing process is simplified, and costs are reduced.

Further, a material of the sheet-shaped resin (80) by which the resin is obtained for impregnation of the fiber reinforced resin layer (52), and a material of the resin for molding (82) by which the functional site (54) is obtained may be made to differ from each other. In this case, the function expressed in the fiber reinforced resin layer (the impregnated site) and the function expressed in the resin layer for molding (the functional site) obtained from the resin for molding can be made to differ from each other. For example, it is also possible to make the resin of the fiber reinforced resin layer excellent in terms of heat resistance, and to make the resin of the resin layer for molding excellent in terms of chemical resistance. In accordance with this feature, the versatility of the fiber reinforced resin molded article is enhanced.

According to the present invention, a fiber reinforced resin molded article is constituted in which an insert member is provided in an integrated manner at a functional site formed by the resin layer for molding which is built up with respect to the fiber reinforced resin layer. Since the functional site is made thicker, the support strength of the insert member is enhanced.

The functional site can be obtained by locally stacking the resin for molding that is used for forming the functional site, and carrying out press molding thereon. More specifically, there is no need to perform a secondary process in order to obtain the thickened portion. Accordingly, the fiber reinforced resin molded article can be obtained easily, with good efficiency, and at a low cost.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a fiber reinforced resin molded article according to the present invention will be presented and described in detail below with reference to the accompanying drawings. In the following embodiments, a clutch cover or a motor cover is exemplified as the fiber reinforced resin molded article.

Figure 1:
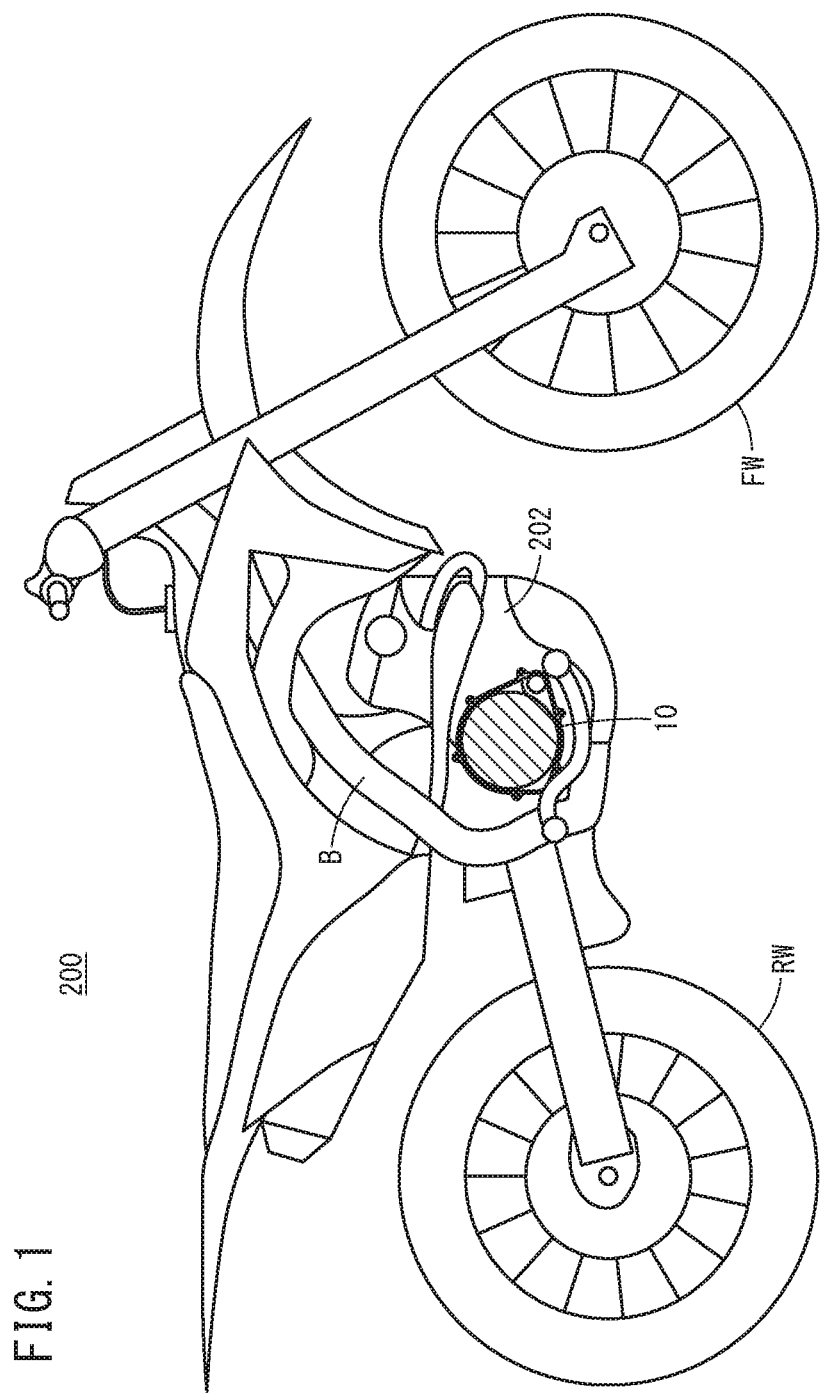
FIG. 1 is a schematic side view of essential components of a motorcycle.

FIG. 1 is a schematic side view of essential components of a motorcycle 200. The motorcycle 200 has a vehicle body B on which an engine 202 is mounted between a front wheel FW and a rear wheel RW, and a clutch cover 10 as a structural component thereof is disposed on the engine 202 which is positioned on an outer side of the vehicle body B. The clutch cover 10 is a fiber reinforced resin molded article according to the first embodiment, and has a function of protecting a clutch or the like inside the engine 202.

Figure 2:
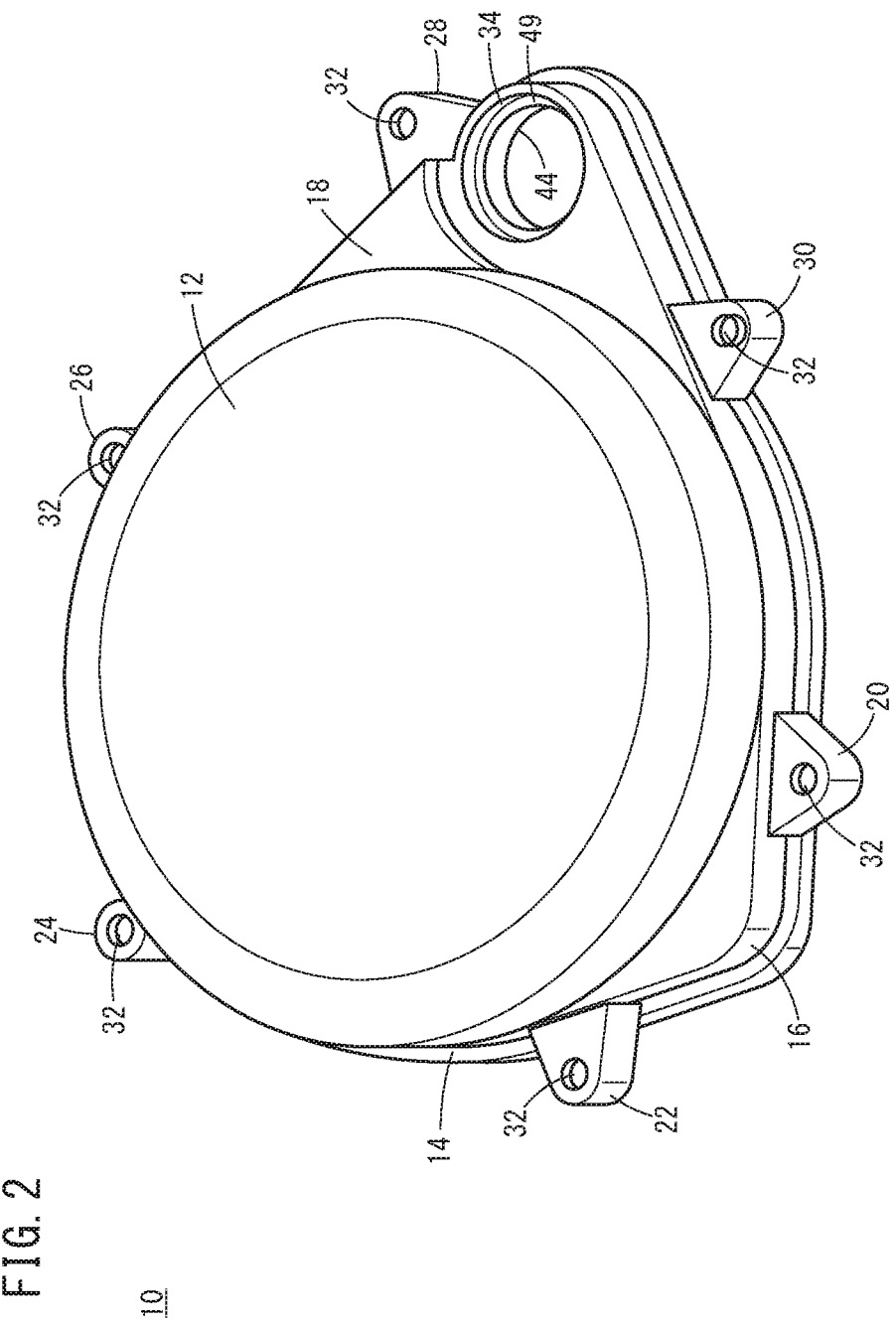
FIG. 2 is a schematic overall perspective view of the appearance of an external design surface of a clutch cover provided in the motorcycle of FIG. 1, which is illustrated by example as a fiber reinforced resin molded article according to a first embodiment of the present invention.
Figure 3:
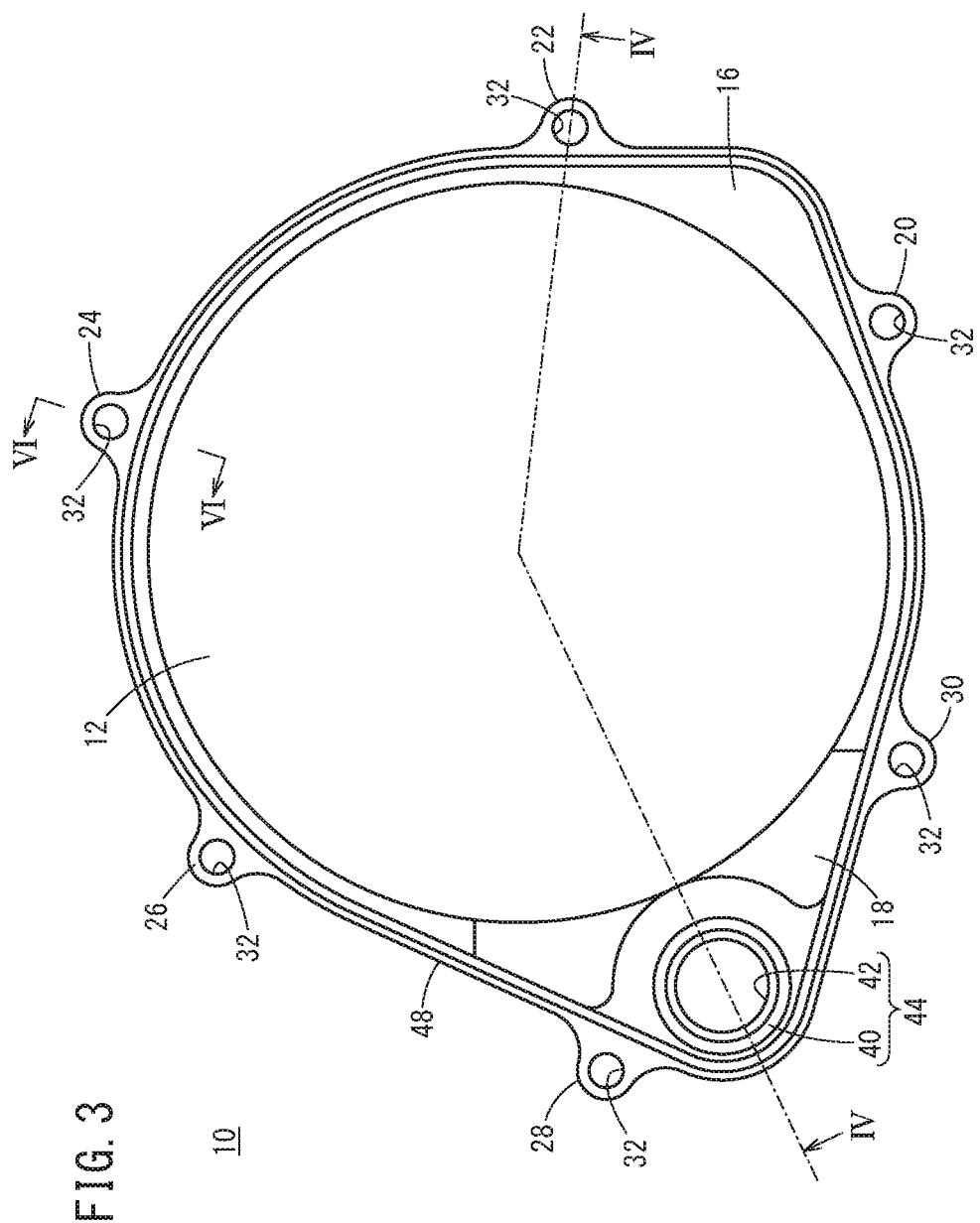
FIG. 3 is a rear view of the clutch cover shown in FIG. 2, as viewed from a rear surface (inner surface) side of the external design surface.
Figure 4:
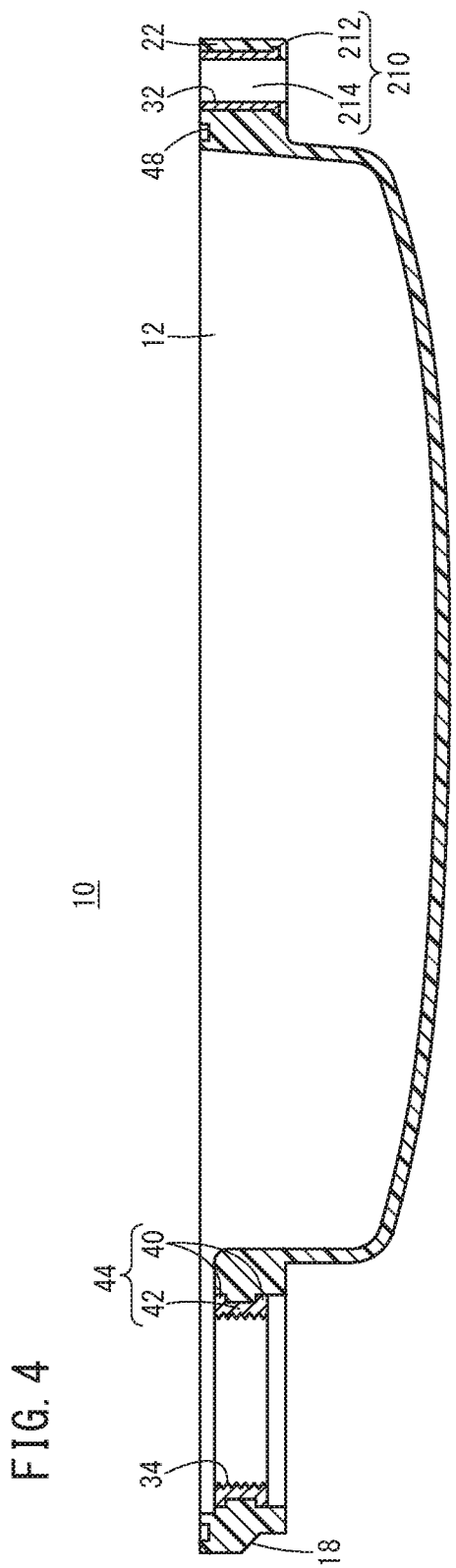
FIG. 4 is a cross-sectional view taken along line IV-IV in FIG. 3.

FIGS. 2 to 4 are views showing a specific example of a main body of the clutch cover 10, and respectively, are a schematic overall perspective view, a rear view as seen from a rear surface (inner surface) side, and a cross-sectional view taken along line IV-IV in FIG. 3.

The clutch cover 10 has a closed end forming the external design surface, and a bottomed cylindrically shaped main body portion 12 made up from an open end facing toward the clutch, and a flange member 14 protrudes from an outer edge of the main body portion 12. A first large tab portion 16 and a second large tab portion 18 that bulge outwardly are connected to the flange member 14. The first large tab portion 16 and the second large tab portion 18 are disposed in a contiguous manner on the open end of the main body portion 12.

A gently curved rounded surface is formed at the end of the first large tab portion 16. A first small tab portion 20 and a second small tab portion 22 are provided respectively in the vicinity of a base of the first large tab portion 16 that is contiguous with the main body portion 12. Furthermore, a third small tab portion 24 and a fourth small tab portion 26 are formed on an outer edge of the flange member 14, and a fifth small tab portion 28 and a sixth small tab portion 30 are formed on an outer edge of the second large tab portion 18. The small tab portions are arranged so as to be separated from each other at a predetermined angle on the outer periphery of the open end of the main body portion 12. Further, in the first small tab portion 20 through the sixth small tab portion 30, small insertion holes 32 are respectively disposed for enabling insertion of mounting bolts 31.

The second large tab portion 18 exhibits an external appearance of a substantially triangular shape that is larger than the first large tab portion 16. A gently curved rounded surface is formed at the top of the second large tab portion 18. The fifth small tab portion 28 is disposed in the middle of a side extending to the top from the base that is contiguous with the main body portion 12. On the other hand, the sixth small tab portion 30 is disposed in the vicinity of the base of the second large tab portion 18.

Figure 5:
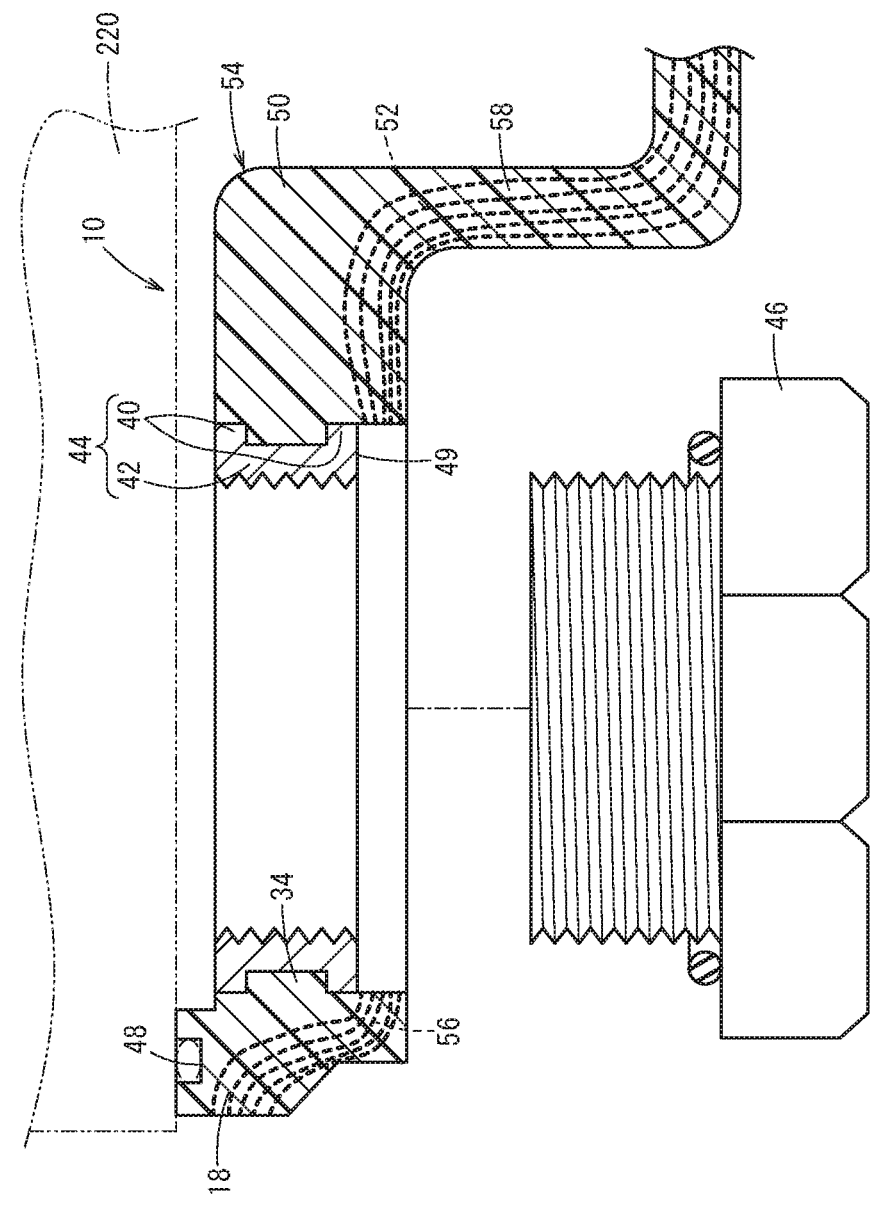
FIG. 5 is a schematic cross-sectional view of a second large tab portion shown in FIG. 3.

As shown in FIGS. 4 and 5, an insertion hole having a retaining member 34 is formed in the second large tab portion 18, and a first collar member 44 made up from a hollow cylindrical body having a cylindrical part 42 on which large diameter parts 40, 40 are provided at both ends is embedded in the interior of the retaining member 34. The height of the first collar member 44 along a thickness direction of the second large tab portion 18 is set to be smaller in length than the thickness of the second large tab portion 18, and in a state in which the large diameter parts 40, 40 are immersed in the interior of the fiber reinforced resin that forms the second large tab portion 18, the first collar member 44 is embedded by insert molding into the second large tab portion 18.

Female screw threads are engraved on the hollow inner surface of the cylindrical part 42 of the first collar member 44. A large diameter maintenance bolt 46 is screw threaded into the female screw threads. The maintenance bolt 46 is capable of being removed for enabling inspection of the engine 202. Further, a seat surface for a sealing o-ring is formed on an upper surface of a stepped portion 49 where the large diameter part 40 is immersed.

Figure 6:
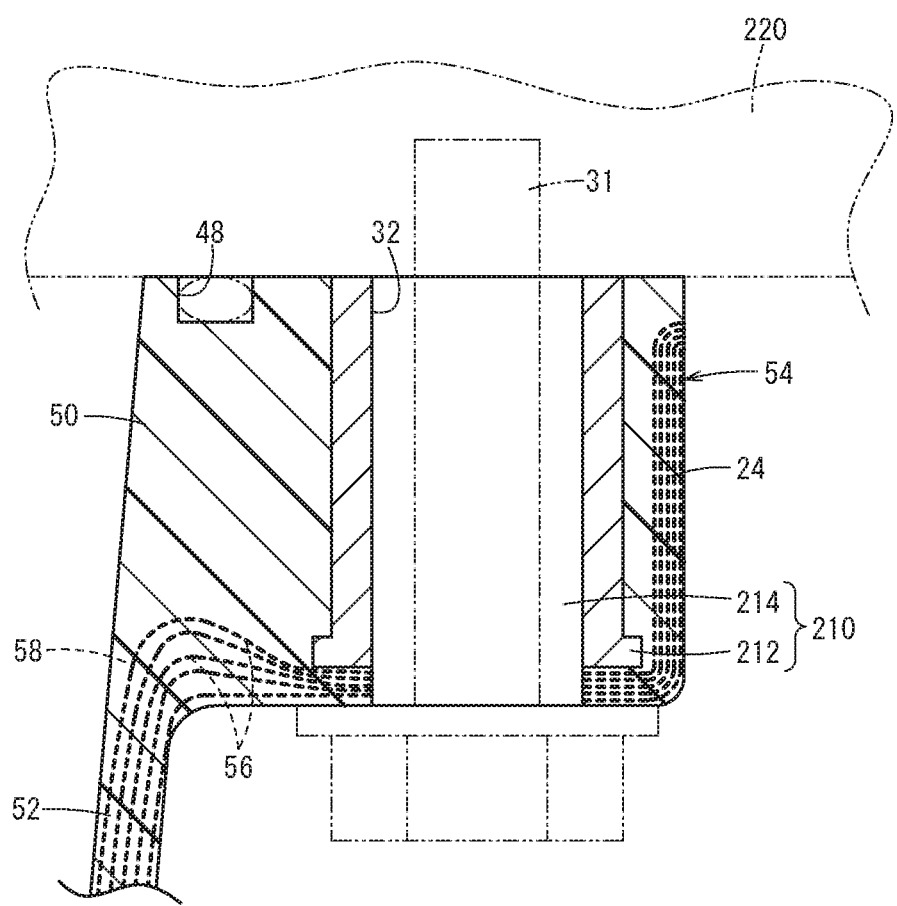
FIG. 6 is a cross-sectional view taken along line VI-VI in FIG. 3.

On the other hand, in each of the small insertion holes 32 disposed in the first small tab portion 20 through the sixth small tab portion 30 and through which the mounting bolts 31 are inserted, as shown in FIG. 6 which illustrates by example the third small tab portion 24, a second collar member 210, which is a hollow cylindrical member, is embedded by insert molding into the resin that forms the clutch cover 10. The second collar member 210 is a hollow cylindrical body made up from a cylindrical part 214 having a large diameter part 212 at one end. Further, the outer side end surface of the large diameter part 212 is embedded in a state of being covered by the fiber reinforced resin that forms the first small tab portion 20 through the sixth small tab portion 30. In this manner, a fastening surface of the mounting bolt 31 is covered by the fiber reinforced resin.

In FIGS. 2 to 4, the flange member 14 of the clutch cover 10 is disposed so as to face toward the closed end of the main body portion 12, and to protrude maximally outward on a diametrical end surface of the main body portion 12. Accordingly, by the flange member 14 and the first large tab portion 16, the second large tab portion 18, the first small tab portion 20 through the fourth small tab portion 26, and the sixth small tab portion 30 which are contiguous with the flange member 14, large thickened portions are constituted in which the thickness of portions along the horizontal direction is thicker than that of the main body portion 12. In addition, a bottomed packing insertion groove 48 having an annular shape is formed on a joint surface of the flange member 14 facing toward a clutch storage case 220. The packing insertion groove 48 is positioned on an outer peripheral side of the first large tab portion 16 and the second large tab portion 18, and on inner peripheral sides of the first small tab portion 20 through the sixth small tab portion 30.

As shown in detail in FIG. 5, on the second large tab portion 18, a thickened site thereof is a functional site 54 that is made up from a resin layer for molding 50. In FIG. 5, an upper portion is the resin layer for molding 50, and a lower portion is a fiber reinforced resin layer 52. More specifically, the functional site 54 has a composite structure composed of the fiber reinforced resin layer 52 which is reinforced with reinforcing fibers 56, and the resin layer for molding 50, and due to the presence or absence of an impregnated site 58 of the reinforcing fibers 56 that are formed in a woven shape, a boundary between locations used for reinforcement and for molding is clearly manifested.

The resin layer for molding 50 is a layer made up from a resin that does not contain any reinforcing fibers 56 therein. On the other hand, the fiber reinforced resin layer 52 is made up from a resin, or stated otherwise, is a fiber reinforced resin containing the reinforcing fibers 56. The reinforcing fibers are constituted, for example, by a woven fabric of carbon fibers, and in order to make the pattern of the carbon fibers easy to see, concerning the resin, for example, a high rigidity polycarbonate resin or the like having high transparency is used.

Although the main body portion 12 is formed by the impregnated site 58 that is made up from a layer of the fiber reinforced resin layer 52, since the second large tab portion 18 is provided additionally with the resin layer for molding 50 in order to supplement the amount of resin, it is possible to cope with a complexity in the shape thereof which is thicker in comparison with the main body portion 12. This structure is the same in the first large tab portion 16 as well as in the first small tab portion 20 through the sixth small tab portion 30.

FIG. 6 is a cross-sectional view taken along line VI-VI in FIG. 3, and shows the third small tab portion 24 which is of the same structure as the second small tab portion 22. In the third small tab portion 24 as well, the upper portion in FIG. 6 is the resin layer for molding 50, and the lower portion is the fiber reinforced resin layer 52. In the same manner as in FIG. 5, the third small tab portion 24 has a composite structure composed of the resin layer for molding 50 and the fiber reinforced resin layer 52, and due to the presence or absence of the impregnated site 58 of the reinforcing fibers 56, a boundary between locations used for reinforcement and for molding is clearly manifested.

Next, with reference to FIGS. 7 to 15, a description will be given concerning a motor cover 100 for covering an electric motor as a fiber reinforced resin molded article according to a second embodiment.

Figure 7:
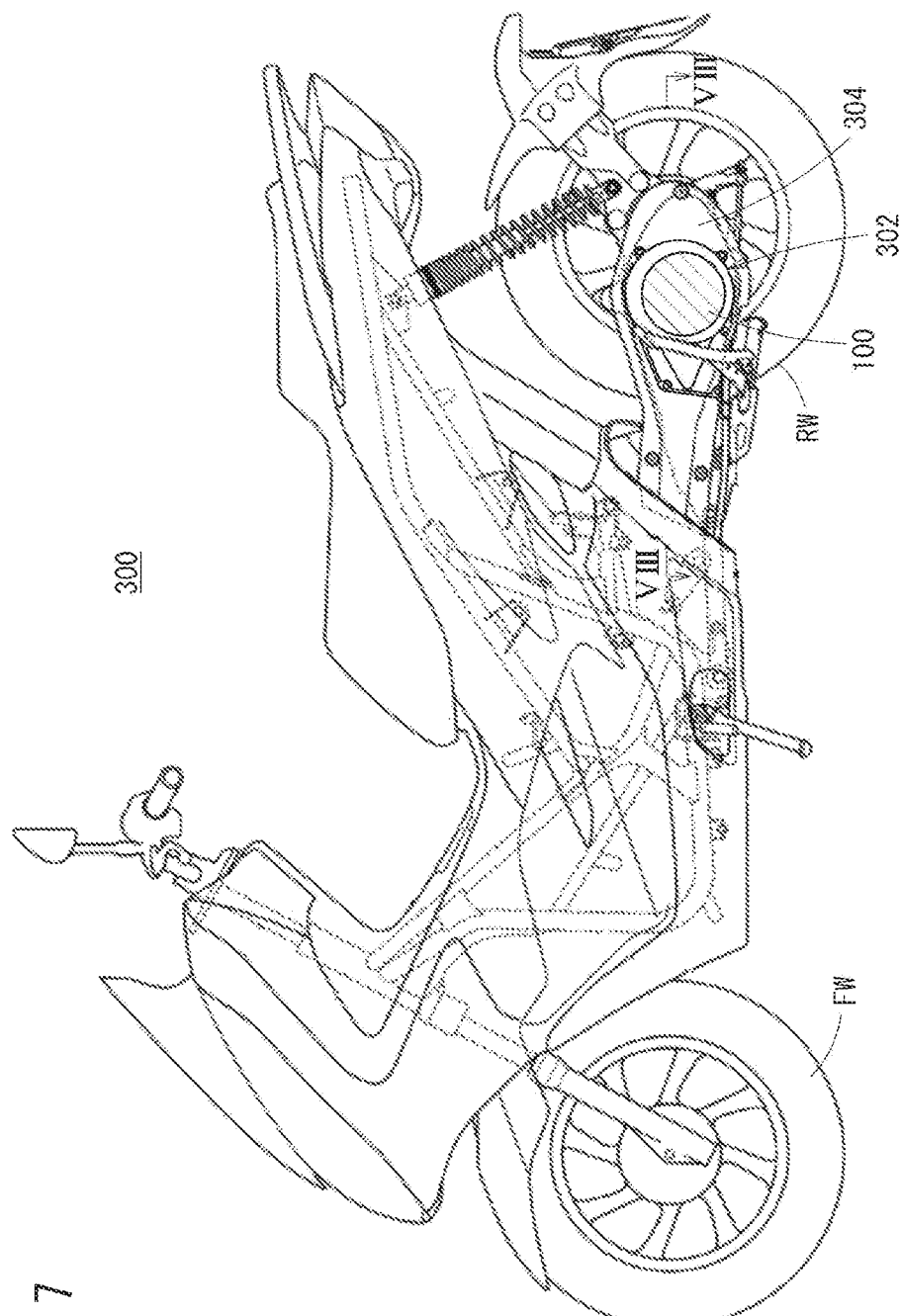
FIG. 7 is a schematic side view of essential components of an electric motorcycle.
Figure 8:
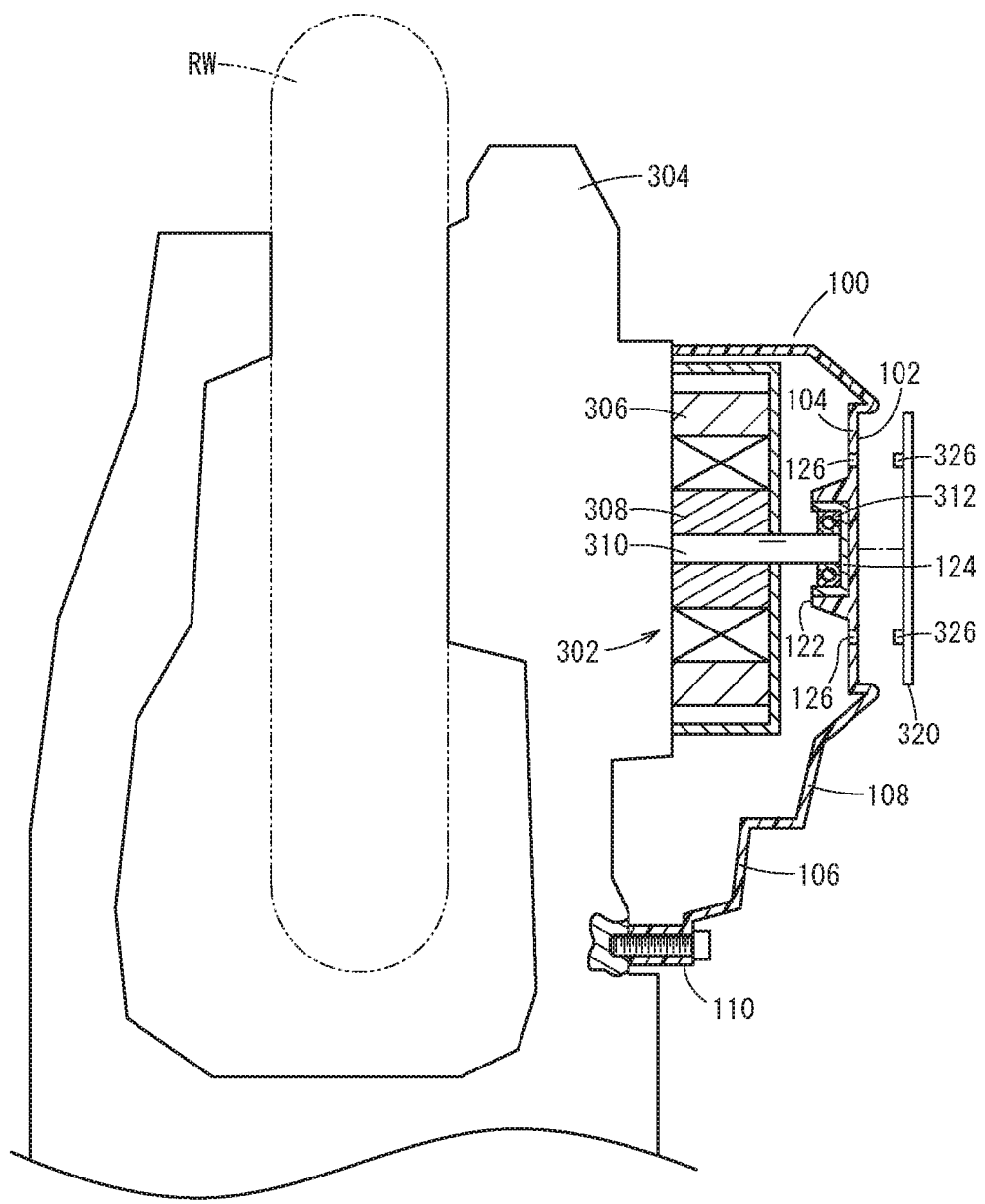
FIG. 8 is a cross-sectional view taken along line VIII-VIII in FIG. 7.

FIG. 7 is a schematic side view of essential components of an electric motorcycle 300. In the electric motorcycle 300, a motor 302 shown in FIG. 8 is mounted thereon as a traveling drive source. The motor 302 includes an annular stator 306 which is incorporated in a swing arm 304 that is integrally mounted on a vehicle body so as to allow the rear wheel RW of the electric motorcycle 300 to swing integrally therewith, and a rotor 308 that rotates on an inner side of the stator 306. The rotor 308 is equipped with a rotating shaft 310 (see FIG. 8). The motor cover 100 supports a bearing 312 that receives an outer side end part of the rotating shaft 310, together with protecting the motor 302.

Figure 9:
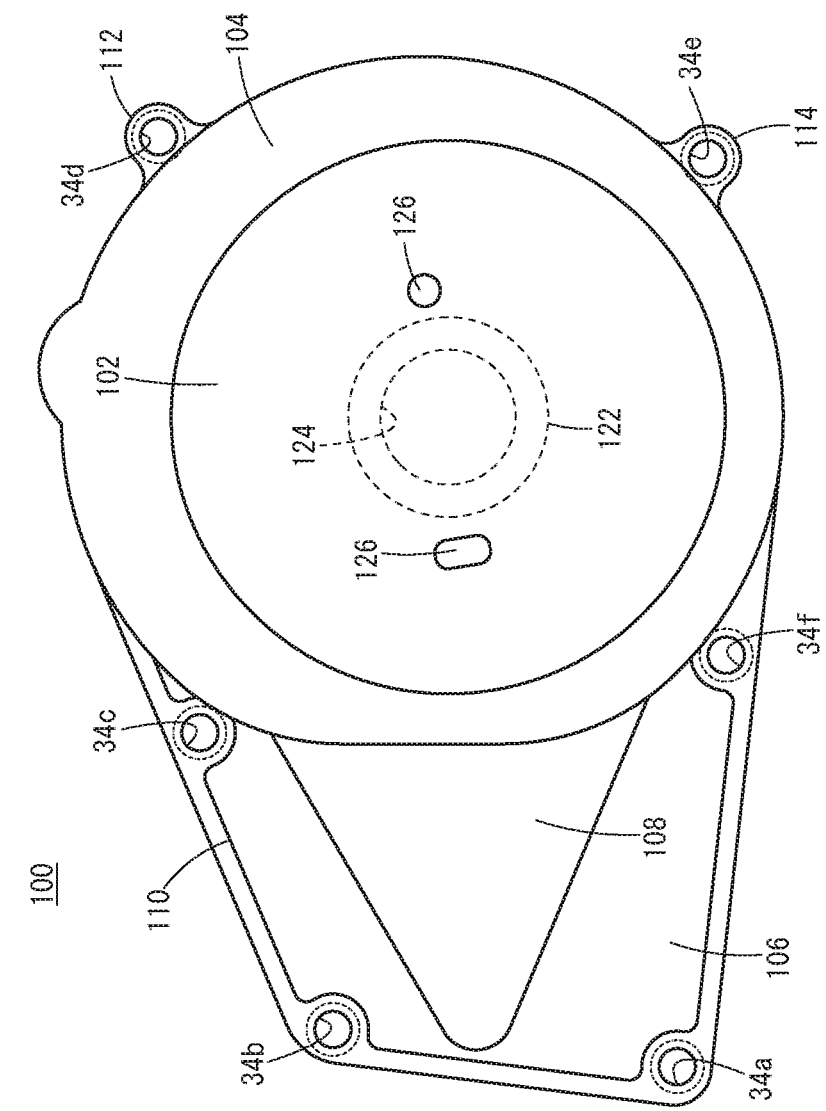
FIG. 9 is a schematic plan view from the side of the external design surface of a motor cover provided in the motorcycle of FIG. 7, which is illustrated by example as a fiber reinforced resin molded article according to a second embodiment of the present invention.
Figure 10:
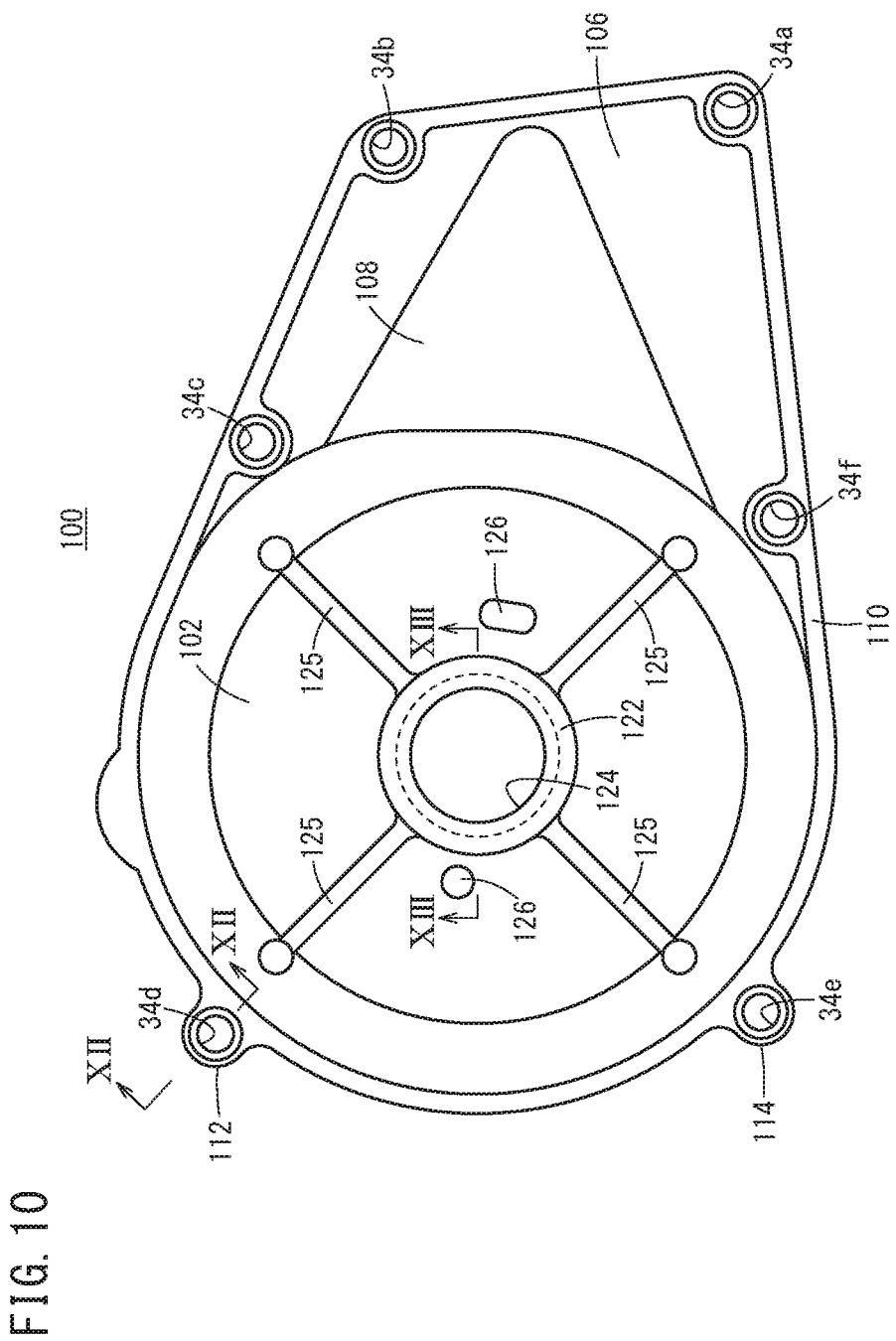
FIG. 10 is a schematic rear view as seen from the side of an inner surface of the motor cover shown in FIG. 9.
Figure 11:
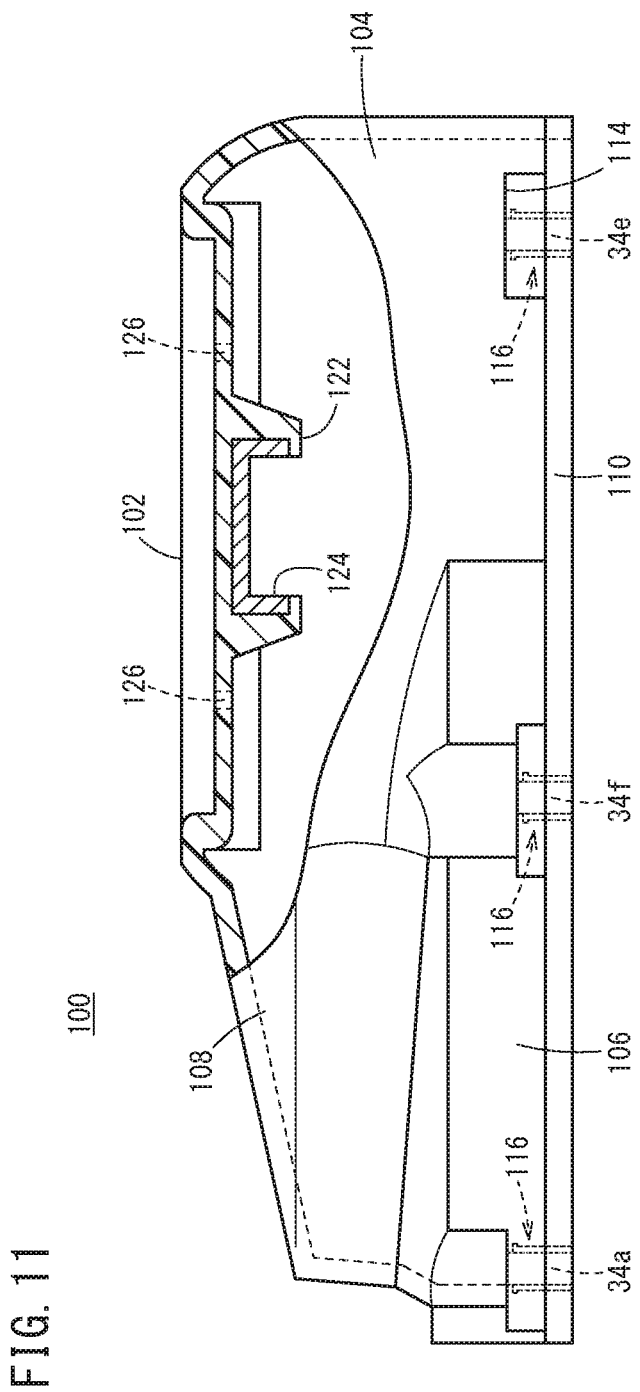
FIG. 11 is a schematic side view of the motor cover shown in FIG. 9.

FIGS. 9 to 11 are a schematic plan view as seen from the side of an external design surface of the motor cover 100, a schematic rear view as seen from the side of an inner surface facing toward the motor 302, and a schematic side view of the motor cover 100, respectively. The motor cover 100 is a hollow body in which the side of the external design surface is a closed end 102 and the side facing toward the motor 302 is an open end, and the side surface includes a cylindrical part 104, a corner portion 106, and a stepped portion 108 which is substantially triangular as viewed in plan. The stepped portion 108 is positioned between the corner portion 106 and the cylindrical part 104, and constitutes a part of the external design surface.

From the bottom of an open end side of the cylindrical part 104 and the corner portion 106, a peripheral edge portion 110 rises and surrounds the entire periphery thereof. Further, a first tab portion 112 and a second tab portion 114 are formed to protrude on the peripheral edge portion 110 in proximity to the cylindrical part 104. First to sixth insertion holes 34a to 34f for the mounting bolts 31 are disposed at four locations on an end edge side of the peripheral edge portion 110, as well as in the first tab portion 112 and the second tab portion 114.

Figure 12:
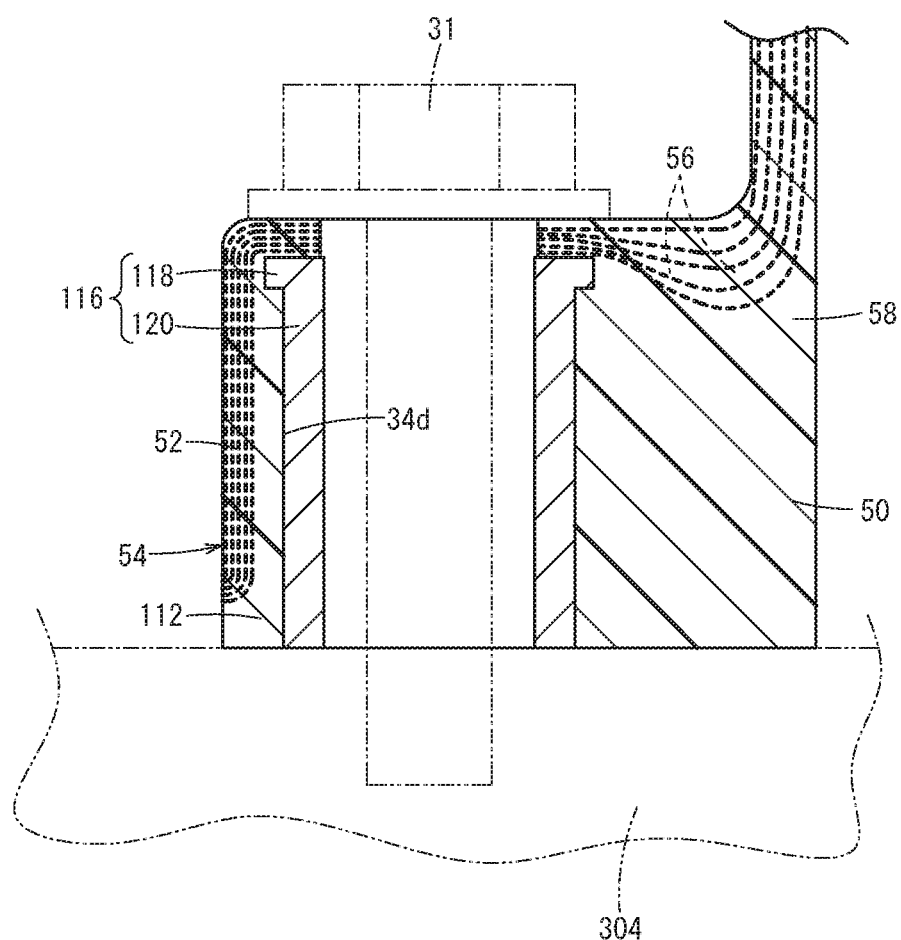
FIG. 12 is a cross-sectional view taken along line XII-XII in FIG. 10.

FIG. 12 is a cross-sectional view taken along line XII-XII in FIG. 10, illustrating by example the fourth insertion hole 34d. In the fourth insertion hole 34d, a metal collar member 116 is embedded by insert molding into a fiber reinforced resin. The collar member 116 includes a large diameter part 118 and a cylindrical part 120. The large diameter part 118 is covered by the fiber reinforced resin layer 52 of the second tab portion 114, and is molded (surrounded) entirely by the resin layer for molding 50. In accordance with this feature, the collar member 116 is positioned and fixed in place.

The first tab portion 112 and the second tab portion 114 are thickened portions which are thicker than the cylindrical part 104, and the site on the right side in the drawing that molds (surrounds) the collar member 116 in FIG. 12 is a functional site 54 made up from the resin layer for molding 50. A fiber reinforced resin layer 52 is stacked and reinforced on the upper and left side surface portions of the functional site 54. As shown in FIG. 12, there is included a composite structure composed of the resin layer for molding 50 and the fiber reinforced resin layer 52, and due to the presence or absence of the impregnated site 58 of the reinforcing fibers 56 that are formed in a woven shape, a boundary between locations used for reinforcement and for molding is clearly manifested.

Although illustration and description thereof are omitted, collar members 116 are similarly embedded by insert molding into the first insertion hole 34a through the third insertion hole 34c, the fifth insertion hole 34e, and the sixth insertion hole 34f.

Figure 13:
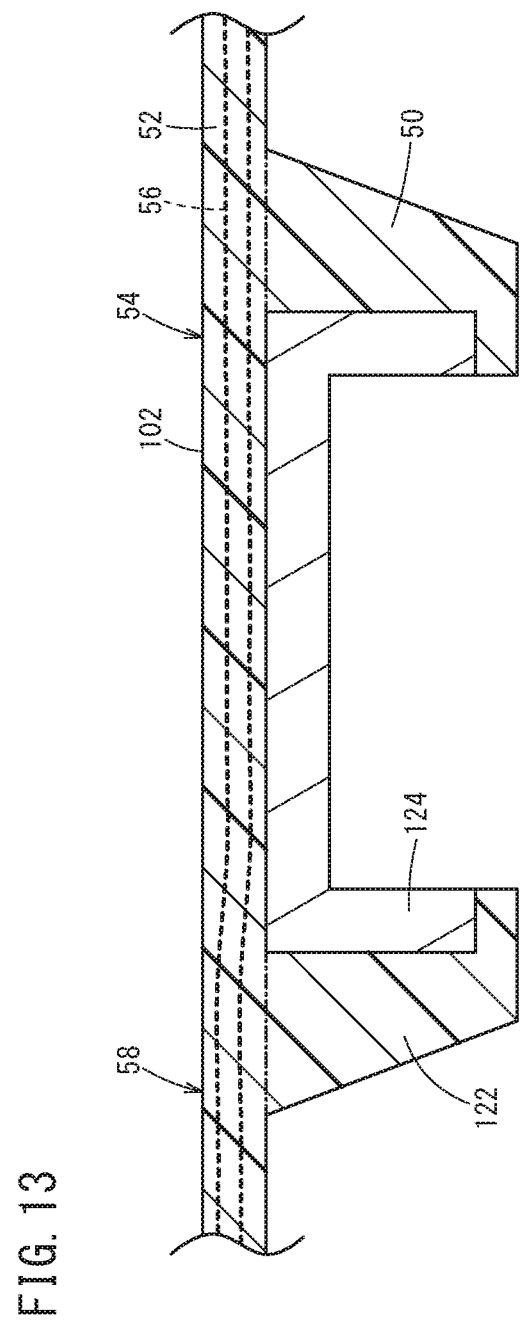
FIG. 13 is a cross-sectional view taken along line XIII-XIII in FIG. 10.

FIG. 13 is a cross-sectional view taken along line XIII-XIII in FIG. 10. As shown in FIG. 13, at the closed end 102 of the cylindrical part 104, an annular projection 122 is formed on the inner surface side thereof. An insert cup 124 is embedded by insert molding in a concave portion of the annular projection 122. The insert cup 124 serves to support a bearing 312 that receives the rotating shaft 310 (see FIG. 8) of the rotor 308, and is a strength enhancing member. Further, the annular projection 122 is reinforced by four reinforcing ribs 125 that extend radially along the closed end 102 of the cylindrical part 104.

As shown in FIG. 13, on the inner surface of the cylindrical part 104, the protruding site of the annular projection 122 is thicker than the closed end 102. The annular projection 122 is made up from the resin layer for molding 50 that does not contain the reinforcing fibers 56, and the closed end 102, which simultaneously serves as a bottom wall closing one end of the annular projection 122, is made up from the fiber reinforced resin layer 52 that is impregnated with resin. More specifically, the functional site 54 is constituted by the annular projection 122 and the closed end 102, with the closed end 102 itself being the impregnated site 58, and since it is embedded in close contact therewith, the functional site 54 is of high rigidity and functions as a strength enhancing member that receives the load from the insert cup 124. Since the main body of the motor cover 100 also includes the fiber reinforced resin layer 52 containing the impregnated site 58, it is possible to enhance the support rigidity thereof with respect to the insert member as a whole.

Engagement holes 126, in which attachment projections 326 of a decorative cover 320 shown in FIG. 8 are engaged, are formed in the closed end 102 at positions located diametrically outward from the annular projection 122.

Figure 14:
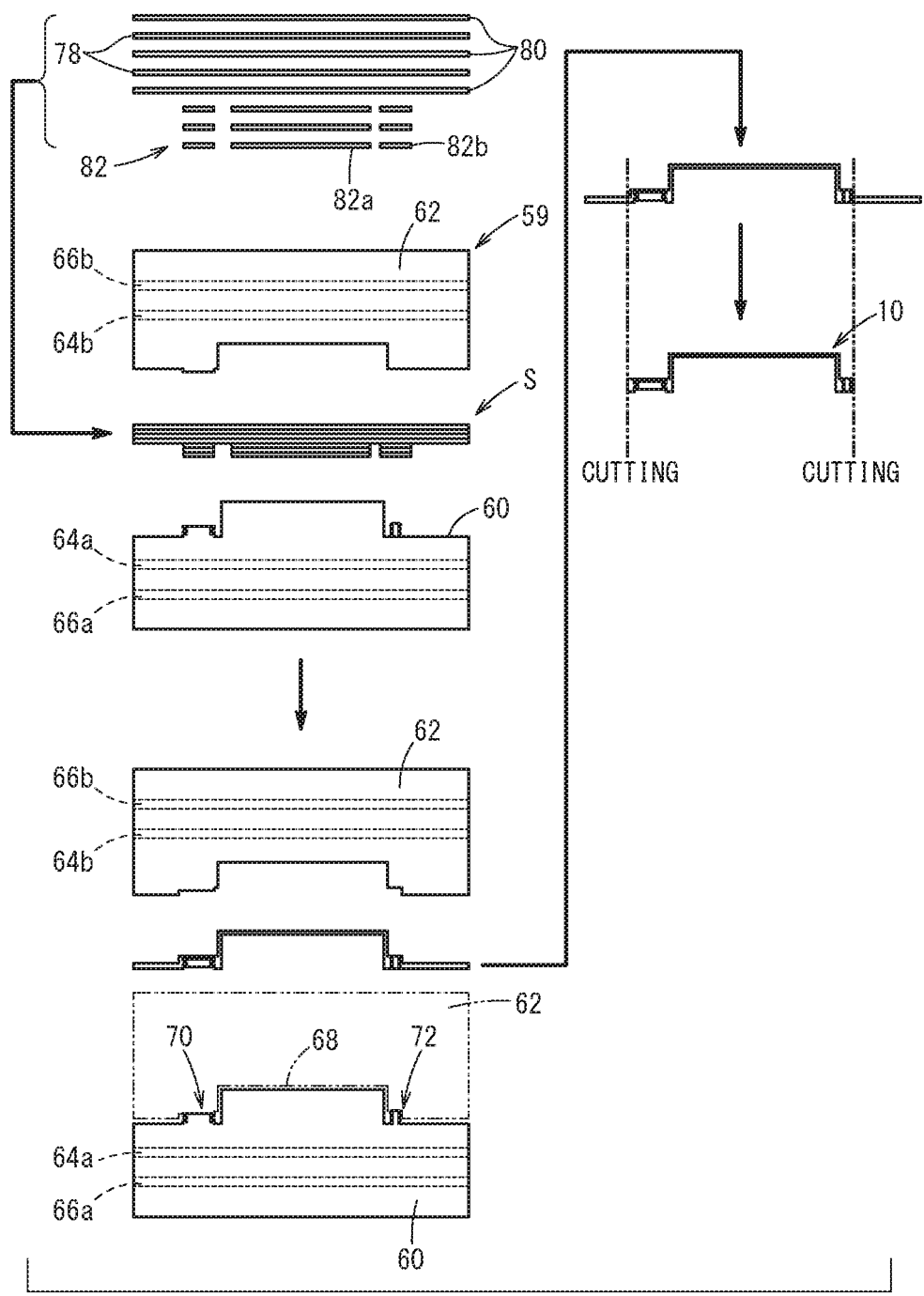
FIG. 14 is a view showing schematically a process flow until the clutch cover shown in FIGS. 2 to 4 is obtained.
Figure 15:
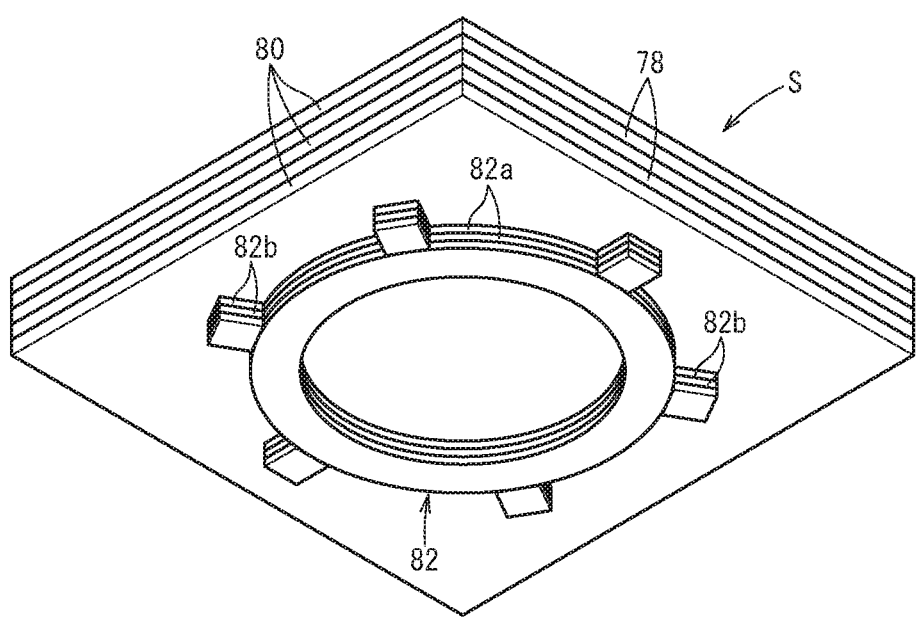
FIG. 15 is a schematic explanatory view showing a state in which a sheet-shaped resin, sheet-shaped reinforcing fibers, and a supplementary sheet-shaped resin for obtaining a thickened site are stacked.

Next, a description will be given concerning a method of manufacturing the clutch cover 10 according to the first embodiment. As shown in FIG. 14, a resin molded article is molded by superimposing sheet-shaped reinforcing fibers 78 which are composed of carbon fibers and resin fibers that are formed in a woven shape, sheet-shaped resin plates 80, and supplementary sheet-shaped resin plates 82 (resin for molding) for ensuring an amount of resin, and as shown in FIG. 15, a stacked body S which is adapted to the shape of the molded article is constructed, and heat is applied to the resins by sandwiching the stacked body S from above and below between a lower die 60 and an upper die 62 including a resin molding die therein, and by carrying out press molding thereon, the resin molded article is molded. In addition, since excess resin remains on the molded article, the excess resin is subjected to a cutting process in accordance with the shape of the product.

A press molding apparatus 59 includes a lower die 60 and an upper die 62 serving as molding dies. The lower die 60 is a fixed die that is positioned and fixed in place, and the upper die 62 is a movable die that approaches toward or separates away from the lower die 60 under the action of a non-illustrated lifting mechanism. Further, in the interiors of the lower die 60 and the upper die 62, there are respectively provided heating devices 64a and 64b such as heaters, and cooling devices 66a and 66b such as cooling oil flow pipes or the like. The lower die 60 and the upper die 62 are maintained within a temperature range, to be described later, by a non-illustrated controller that controls the heating devices 64a and 64b.

A cavity 68 is formed by closing the lower die 60 and the upper die 62. Before press molding is carried out, an insert member such as an insert fitting or the like is installed in the cavity 68 that is formed by the dies, and large tab portion molding parts 70, small tab portion molding parts 72, and the like are retained on the lower die 60.

Figure 16:
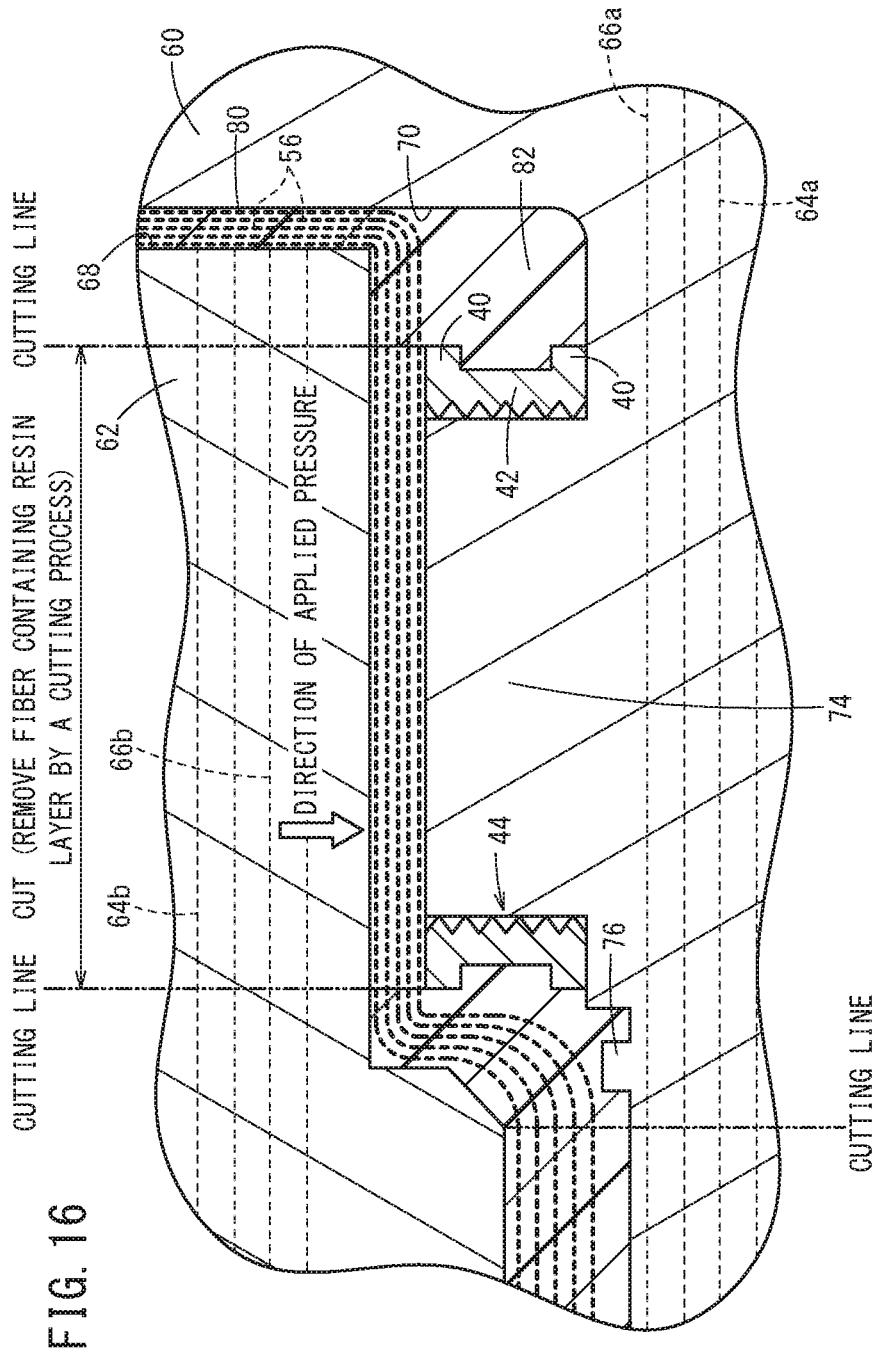
FIG. 16 is a schematic cross-sectional view of a portion for molding the site shown in FIG. 5 of a press-forming apparatus for obtaining the clutch cover shown in FIGS. 2 to 4.
Figure 17:
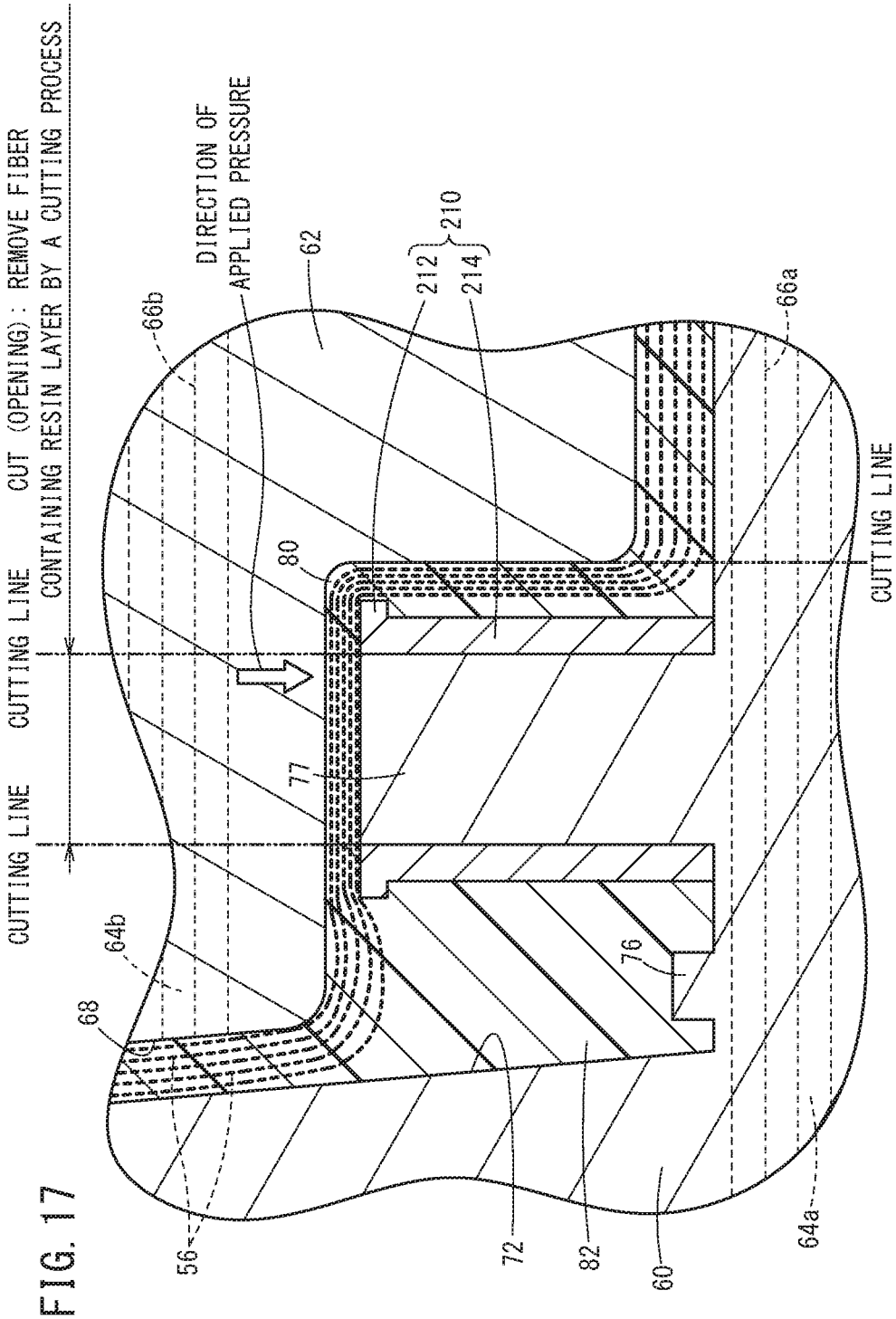
FIG. 17 is a schematic cross-sectional view of a portion of the press molding apparatus for forming the site shown in FIG. 6.

FIGS. 16 and 17 are schematic cross-sectional views showing individual locations of the press forming apparatus 59 for forming the sites shown in FIGS. 5 and 6, respectively. First, as shown in FIG. 14, at a location of the lower die 60 where a second large tab portion molding part 70 is formed, a first cylindrical convex portion 74 for positioning the first collar member 44 as shown in FIG. 16 protrudes toward the upper die 62. The first cylindrical convex portion 74 is passed through the hollow interior of the first collar member 44. The height of the first cylindrical convex portion 74 is substantially equivalent to the height of the first collar member 44. Further, at a location of the lower die 60 where the large tab portion molding part 70 is formed, an annular convex portion 76 for molding the packing insertion groove 48 is formed in a protruding manner. The annular convex portion 76 extends around the entire circumference including the locations where the first small tab portion 20 through the sixth small tab portion 30 are formed.

Further, as shown in FIG. 16, the fiber reinforced resin layer 52 is formed by covering the upper end opening of the first collar member 44 by a pressing force at a time that heated press molding is carried out as discussed above, and after molding, the fiber reinforced resin layer 52 is removed by machining.

As shown in FIG. 17, at a location where the small tab portion molding part 72 is formed, a second cylindrical convex portion 77 for positioning the second collar member 210 protrudes toward the upper die 62. The second cylindrical convex portion 77 is passed through the hollow interior of the second collar member 210.

In this manner, there is used as a starting material a stacked body in which the sheet-shaped reinforcing fibers 78 made up from a woven fabric made of carbon fibers, and the sheet-shaped resin plates 80 are alternately stacked in plurality as shown in FIG. 14, and the clutch cover 10 is obtained using the aforementioned press molding apparatus 59. In this instance, as shown in FIG. 15, at a thickened location, i.e., a location where the functional site 54 is molded, small area supplementary sheet-shaped resin plates 82 are stacked partially as the resin for molding in accordance with the capacity of the resin used for molding the functional site. In order to facilitate understanding, in FIG. 15, as the supplementary sheet-shaped resin plates 82, annular bodies 82a of a site where the flange member 14 is obtained, and small pieces 82b of sites where the first small tab portion 20 through the sixth small tab portion 30 are obtained are shown in a simplified manner. In order to install the stacked body S between the lower die 60 and the upper die 62, the supplementary sheet-shaped resin plates 82 are retained and held together integrally in a temporarily fixed state by ultrasonic bonding.

Preferred examples of the sheet-shaped reinforcing fibers 78 include woven or non-woven fabrics made of carbon fibers. Further, the sheet-shaped resin plates 80, the annular bodies 82a, and the small pieces 82b are made up, for example, from polycarbonate. The sheet-shaped resin plates 80 made from polycarbonate may be used, and the annular bodies 82a and the small pieces 82b which are made up from a different type of resin, for example, a resin having excellent chemical resistance, may be used.

In order to obtain the clutch cover 10, the heating devices 64a and 64b are energized under the action of the controller, and the lower die 60 and the upper die 62 are raised to predetermined temperatures. For example, the lower die 60 is heated to a temperature that is greater than or equal to the melting point of the sheet-shaped resin plates 80 and the supplementary sheet-shaped resin plates 82, and the upper die 62 is maintained within a temperature range from the glass transition temperature or greater to a temperature that is less than the melting point of the sheet-shaped resin plates 80 and the supplementary sheet-shaped resin plates 82. Moreover, in the case that at least one of the sheet-shaped resin plates 80 and the supplementary sheet-shaped resin plates 82 is made of polycarbonate, the melting point thereof is approximately 250° C.

Next, the upper die 62 is lowered toward the lower die 60 to thereby close the mold. More specifically, the cavity 68 is formed, and together therewith, in a state in which the sheet-shaped resin plates 80, the sheet-shaped reinforcing fibers 78, and the supplementary sheet-shaped resin plates 82 of the integrated stacked body S are stacked together in plurality, they are heated by the heating devices 64a and 64b, and are pressed to thereby be formed into a shape corresponding to the shape of the cavity 68. At that time, heat is applied to the sheet-shaped resin plates 80 and the supplementary sheet-shaped resin plates 82 from the lower die 60 and the upper die 62 which have been raised in temperature, and the resins are melted to form a flowable resin. In particular, the flowable resin having the sheet-shaped resin plates 80 as its source and sandwiching therebetween the sheet-shaped reinforcing fibers 78 having spaces where the fibers of the fabric intersect is impregnated inside the spaces between the fibers of the sheet-shaped reinforcing fibers 78.

When impregnation and molding are completed, under the control of the controller, the heating devices 64a and 64b are stopped, and upon activation of the cooling devices 66a and 66b, the temperatures of the lower die 60 and the upper die 62 are decreased. Along therewith, the resin cover including the fiber reinforced resin layer 52 is formed by solidification or hardening of the impregnated flowable resin.

On the other hand, the flowable resin having as its source the supplementary sheet-shaped resin plates 82 is also welded to the sheet-shaped resin plates 80 in which the flowable resin is impregnated into the spaces between the fibers, and undergoes solidification or hardening. As a result, the resin layer for molding 50 is formed. Consequently, a high-strength functional site 54 in which the fiber reinforced resin layer 52 and the resin layer for molding 50 are combined is obtained. Furthermore, since the portion where the supplementary sheet-shaped resin plates 82 are not disposed remains unchanged in the form of the impregnated site 58 made up from the fiber reinforced resin layer 52, the portion can be made thinner.

According to the present embodiment, in the large tab portion molding part 70, the first collar member 44 (see FIG. 16) that is positioned and fixed to the first cylindrical convex portion 74 is surrounded by the flowable resin having as its source the sheet-shaped resin plates 80, or alternatively, the supplementary sheet-shaped resin plates 82. In this instance, the height direction of the first collar member 44 substantially coincides with the direction (pressing direction) in which the sheet-shaped resin plates 80 and the sheet-shaped reinforcing fibers 78 are pressed by the lower die 60 and the upper die 62. Therefore, the upper portion of the first collar member 44 in proximity to the upper die 62 is kept in close contact with the fiber reinforced resin layer 52.

In this state, accompanying solidification or hardening of the flowable resin to thereby form the functional site 54, the second large tab portion 18 having the first collar member 44 inserted therein is molded, and so-called insert molding is performed. Due to the large diameter parts 40 being pressed into the inner wall of the second large tab portion 18, the first collar member 44 is firmly retained by the second large tab portion 18.

Similarly, in the third small tab portion molding part 72 shown in FIG. 17, the flowable resin that is impregnated in the sheet-shaped resin plates 80, and the flowable resin having as its source the supplementary sheet-shaped resin plates 82 undergo hardening. The height direction of the second collar member 210 also substantially coincides with the direction (pressing direction) in which the sheet-shaped resin plates 80 and the sheet-shaped reinforcing fibers 78 are pressed by the lower die 60 and the upper die 62, and therefore, the upper portion of the second collar member 210 in proximity to the upper die 62 is kept in close contact with the fiber reinforced resin layer 52. As a result, the third small tab portion 24 is formed, which is made up from the functional site 54 into which the second collar member 210 is inserted in a manner so that it is less likely to come off.

Figure 18:
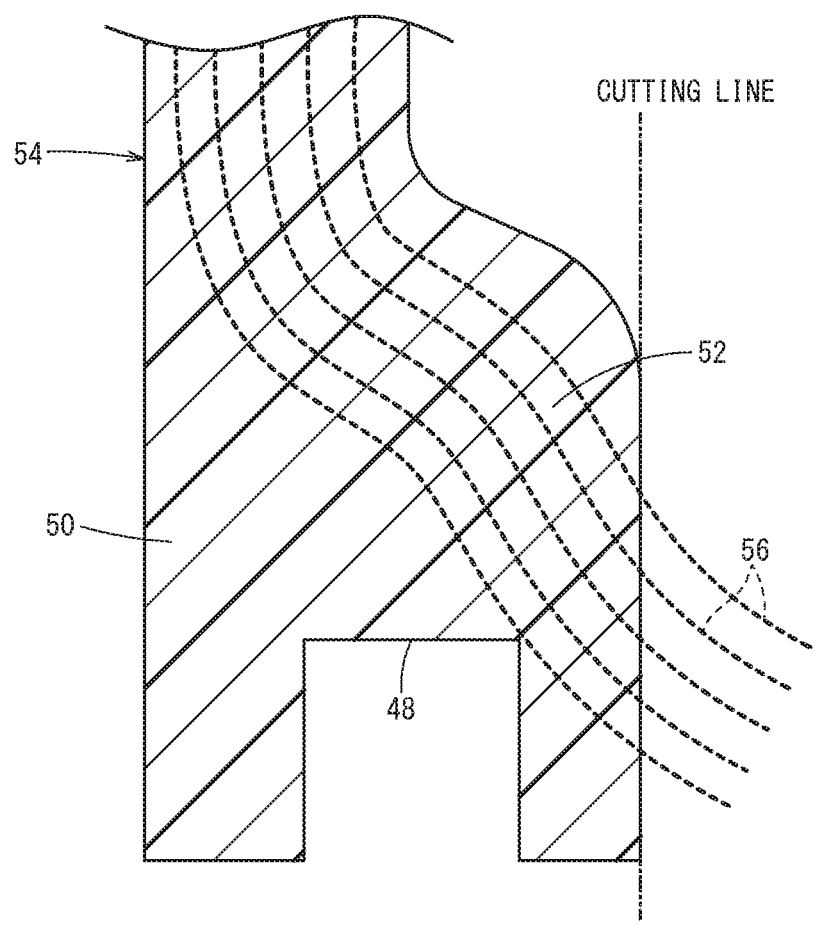
FIG. 18 is a longitudinal cross-sectional view of essential components, schematically showing a state in which trimming is carried out on exposed reinforcing fibers.

As shown in FIGS. 16 to 18, the packing insertion groove 48 corresponding to the annular convex portion 76 is formed in the resin layer for molding 50 that makes up the functional site 54. Since the resin layer for molding 50 of the packing insertion groove 48 may have a smaller amount of resin in comparison with other locations, as shown in FIG. 18, the fiber reinforced resin layer 52 that is impregnated into the spaces between the textile-like or woven fibers is subjected to molding in a state of being in close proximity to the packing insertion groove 48. In this manner, the functional site 54 is molded, and the clutch cover 10 in the form of a fiber reinforced resin molded article made up from the fiber reinforced resin is obtained.

After mold opening of the press molding apparatus 59 is performed and the clutch cover 10 is taken out, as shown in FIGS. 14 and 18, a cutting process is performed to cut the resin layer containing an excessive amount of the reinforcing fibers 56 that protrude from the clutch cover 10, and finishing is performed to obtain a final product. In this manner, according to the present embodiment, since the pressing process is performed in a state in which the stacked body S is formed, the clutch cover 10 can be obtained without passing through a prepreg stage of being preheated beforehand and placed in a semi-hardened state.

In addition, according to the present embodiment, as described above, the supplementary sheet-shaped resin plates 82 of the annular bodies 82a or the small pieces 82b or the like are disposed in a molding part that forms a thickened location, and heated press molding is carried out thereon. Therefore, thin-walled locations and thickened locations can be formed simultaneously. Accordingly, not merely formation of a thin-walled location, but also formation of a thickened location can be performed simultaneously, and manufacturing can be carried out with high efficiency. Further, equipment investment and costs can be reduced.

Further, in the case that the resin in the fiber reinforced resin layer 52 and the resin that forms the resin layer for molding 50 are different types of materials, a complex configuration can be provided in which the fiber reinforced resin layer 52 and the resin layer for molding 50 exhibit characteristics that differ mutually from each other. For example, it is possible to make the resin of the fiber reinforced resin layer 52 excellent in terms of heat resistance, whereas the resin layer for molding 50 can be made excellent in terms of chemical resistance. By adopting such a configuration, the scope of application is expanded, and versatility is enhanced. Consequently, in the fiber reinforced resin molded article, the additional function required for the resin layer for molding 50 can be realized by appropriately selecting, as the material within the resin layer for molding 50, a material of a different type than the resin within the fiber reinforced resin layer 52.

According to the present embodiment, the large diameter parts 40 of the first collar member 44 (insert member) that are inserted into the second large tab portion 18 protrude into the inner wall of the second large tab portion 18. Accordingly, the first collar member 44 is prevented from coming off. In addition, a region upwardly from the vicinity of the large diameter part 40 of the first collar member 44 adheres closely to the fiber reinforced resin layer 52. The same features apply to the second collar members 210 inserted into the first small tab portion 20 through the sixth small tab portion 30. Thus, the product quality is superior.

In addition, the packing insertion groove 48 is formed only in the resin layer for molding 50. More specifically, the packing insertion groove 48 does not reach through to the fiber reinforced resin layer 52. For this reason, the fiber reinforced resin layer 52 can be formed with adequate thickness. Moreover, since the annular convex portion 76 does not press on the sheet-shaped reinforcing fibers 78, deformation of the sheet-shaped reinforcing fibers 78 is avoided. Therefore, impregnation of the flowable resin with respect to the sheet-shaped reinforcing fibers 78 is not inhibited. For the reasons described above, the functional site 54 is provided with sufficient rigidity and strength.

Figure 19:
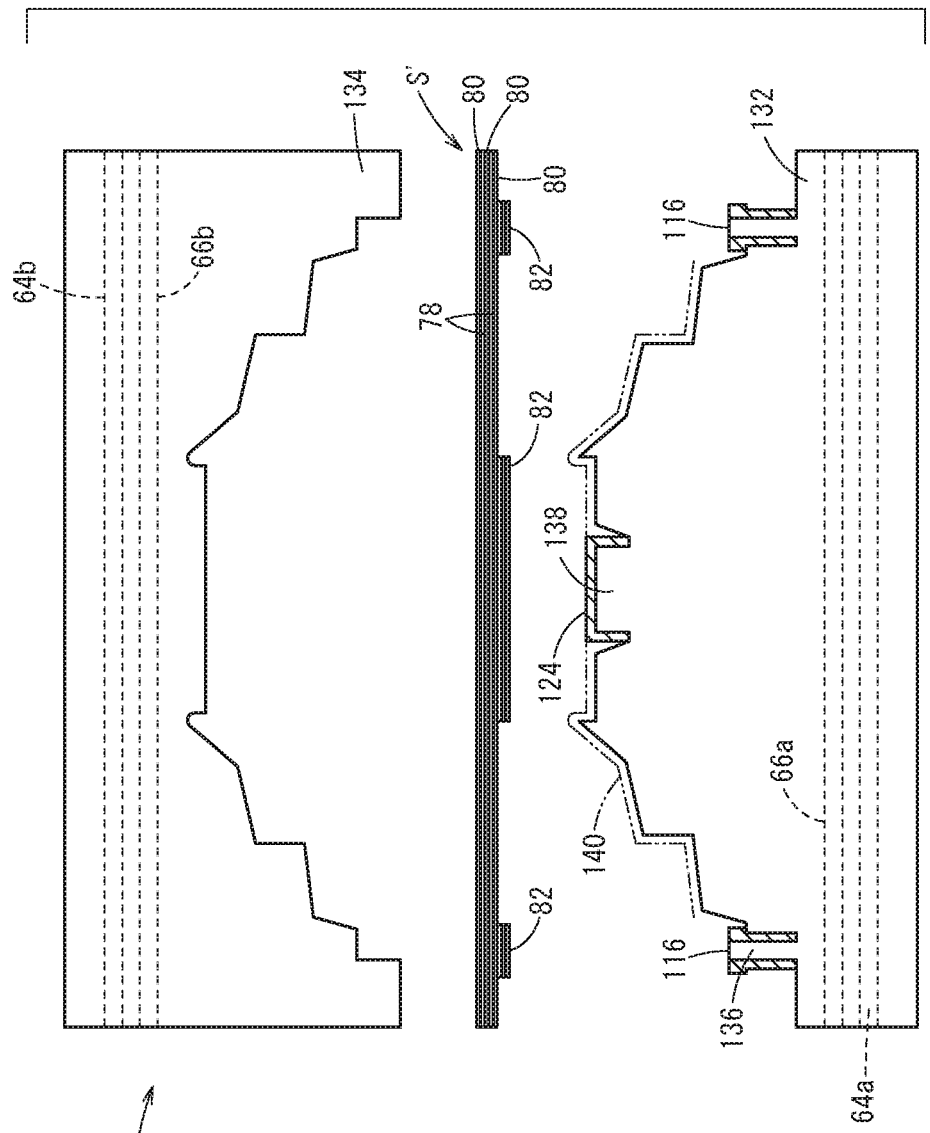
FIG. 19 is a schematic longitudinal cross-sectional view of a press molding apparatus for obtaining the motor cover shown in FIGS. 9 to 11.

FIG. 19 is a schematic longitudinal cross-sectional view of a press molding apparatus 130 for obtaining the motor cover 100 shown in FIGS. 9 to 11. The press molding apparatus 130 includes a lower die 132 and an upper die 134 in the same manner as the embodiment described above. The lower die 132 is a fixed die that is positioned and fixed in place, and the upper die 134 is a movable die that approaches toward or separates away from the lower die 132 under the action of a non-illustrated lifting mechanism. Further, in the interiors of the lower die 132 and the upper die 134, there are respectively provided heating devices 64a and 64b such as heaters, and cooling devices 66a and 66b such as cooling oil flow pipes or the like. The press molding apparatus 130 further includes a controller that controls the heating devices 64a and 64b and the cooling devices 66a and 66b.

In the lower die 132, there are formed in a protruding manner directed toward the upper die 134 six individual insertion hole forming cylindrical portions 136 for forming the first to sixth insertion holes 34a to 34f, and a projection forming cylindrical portion 138 for forming the annular projection 122. The insertion hole forming cylindrical portions 136 are passed through the hollow interior of the collar members 116. The height of the insertion hole forming cylindrical portions 136 is substantially equivalent to the height of the collar members 116. Further, the insert cup 124 is covered and retained on the projection forming cylindrical portion 138.

As shown in FIG. 19, there is used as a starting material a stacked body S' in which the sheet-shaped reinforcing fibers 78 and the sheet-shaped resin plates 80 are alternately stacked in plurality, and the motor cover 100 is obtained using the press molding apparatus 130. Moreover, small area supplementary sheet-shaped resin plates 82 are stacked in accordance with the amount of resin required at a location forming the functional site 54, and more specifically, for example, at locations in the vicinity of the first to sixth insertion holes 34a to 34f and where the annular projection 122 is obtained, to thereby make up the stacked body S'.

In order to obtain the motor cover 100, the heating devices 64a and 64b are operated by the controller, and the lower die 132 and the upper die 134 are raised to predetermined temperatures. For example, the lower die 132 is heated to a temperature that is greater than or equal to the melting point of the sheet-shaped resin plates 80 and the supplementary sheet-shaped resin plates 82, and the upper die 134 is maintained within a temperature range from the glass transition temperature or greater to a temperature that is less than the melting point of the sheet-shaped resin plates 80 and the supplementary sheet-shaped resin plates 82.

Next, the upper die 134 is lowered toward the lower die 132 to thereby close the mold. Along therewith, a cavity 140 is formed, and together therewith, the sheet-shaped resin plates 80, the sheet-shaped reinforcing fibers 78, and the supplementary sheet-shaped resin plates 82 are pressed to thereby be formed into a shape corresponding to the shape of the cavity 140. At the same time, heat is applied to the sheet-shaped resin plates 80, the sheet-shaped reinforcing fibers 78, and the supplementary sheet-shaped resin plates 82 from the lower die 132 and the upper die 134 which have been raised in temperature, and the sheet-shaped reinforcing fibers 78 and the supplementary sheet-shaped resin plates 82 are melted to become a flowable resin. The flowable resin having the sheet-shaped resin plates 80 as its source and sandwiching the sheet-shaped reinforcing fibers 78 therebetween is impregnated between the fibers of the sheet-shaped reinforcing fibers 78.

Thereafter, when the heating devices 64a and 64b are stopped by the controller, and the cooling devices 66a and 66b are activated, the temperatures of the lower die 132 and the upper die 134 are decreased, and the flowable resin is solidified or hardened. As a result, the fiber reinforced resin layer 52 is formed.

On the other hand, the flowable resin having as its source the supplementary sheet-shaped resin plates 82 is also welded to the sheet-shaped resin plates 80 in which the flowable resin is impregnated into the spaces between the fibers, and undergoes hardening. Consequently, a high-strength functional site 54 in which the fiber reinforced resin layer 52 and the resin layer for molding 50 are combined is formed. Since the portion where the supplementary sheet-shaped resin plates 82 are not disposed remains unchanged in the form of the impregnated site 58 made up from the fiber reinforced resin layer 52, the portion can be made thinner.

When forming the motor cover 100, in the lower die 132, the collar members 116 positioned and held by the insertion hole forming cylindrical portions 136 are the sheet-shaped resin plates 80, or alternatively, the supplementary sheet-shaped resin plates 82. In this instance, the height direction of the collar members 116 substantially coincides with the direction (pressing direction) in which the sheet-shaped resin plates 80 and the sheet-shaped reinforcing fibers 78 are pressed by the lower die 132 and the upper die 134. Therefore, the upper portions of the collar members 116 in proximity to the upper die 134 are kept in close contact with the fiber reinforced resin layer 52.

In this state, accompanying solidification or hardening of the flowable resin to thereby form the functional site 54, the second tab portion 114 into which the collar member 116 is inserted is molded. Due to the large diameter part 118 being embedded in the inner wall of the second tab portion 114, the collar member 116 is firmly retained by the second tab portion 114. In the second tab portion 114, the lower portion is the resin layer for molding 50, and the upper portion is the functional site 54 made up from the fiber reinforced resin layer 52. The same features apply to the collar members 116 apart from the collar member 116 disposed in the second tab portion 114.

On the other hand, the flowable resin (the supplementary sheet-shaped resin plates 82) pressed by the projection forming cylindrical portion 138 is stretched around the projection forming cylindrical portion 138. The projection forming cylindrical portion 138 and the insert cup 124 are surrounded by the stretched flowable resin. Due to hardening of the flowable resin, the annular projection 122 is molded as the resin layer for molding 50 surrounding the insert cup 124. In contrast thereto, in the vicinity of the upper die 134, the flowable resin impregnated into the sheet-shaped resin plates 80 is hardened to thereby constitute the closed end 102 that is made up from the fiber reinforced resin layer 52. The functional site 54 is formed by the annular projection 122 and a portion of the closed end 102. In the foregoing manner, the motor cover 100 in the form of a fiber reinforced resin molded article made up from the fiber reinforced resin is obtained.

Next, the upper die 134 is raised so as to open the mold, and the motor cover 100 is taken out. In the same way as the above-described clutch cover 10, the motor cover 100 can also be obtained without passing through a prepreg stage. Further, since a secondary process such as injection molding or the like is rendered unnecessary, equipment investment and costs can be reduced.

In addition, a strength enhancing member can be inserted into the resin layer for molding 50, or the additional function can be expressed in accordance with needs, and in the same manner as discussed above, quality is excellent, and sufficient rigidity and strength are imparted to the functional site 54 that is made up from the fiber reinforced resin layer 52.

The present invention is not particularly limited to the embodiment described above, and various modifications thereto are possible without departing from the essence and gist of the present invention.

For example, the fiber reinforced resin molded article is not limited to being the clutch cover 10, the motor cover 100, or the like, and can also be applied to a cover of a cylinder head that emits high heat from the engine components.

What is claimed is:

1. A fiber reinforced resin molded article, comprising:
   a fiber reinforced resin layer consisting of a fiber reinforced resin in which reinforcing fibers are impregnated with a resin; and
   a functional site consisting of a resin layer that does not contain the reinforcing fibers;
   wherein
   the fiber reinforced resin layer and the functional site are cured layers,
   the fiber reinforced resin layer and the functional site are stacked in relation to each other in a thickness direction of the fiber reinforced resin molded article,
   at least the functional site comprises a hole,
   an insert member is
   disposed only on an inner circumference of the hole of the functional site and integrally coupled to the functional site, and
   the fiber reinforced resin layer is placed in facing relation to an end surface of the insert member and a pressure applying surface of a fastening member.

2. The fiber reinforced resin molded article according to claim 1, wherein an end portion of the insert member is provided integrally in a state of being reinforced by the fiber reinforced resin layer.

3. The fiber reinforced resin molded article according to claim 1, wherein an end portion of the insert member is surrounded by the resin layer.

4. The fiber reinforced resin molded article according to claim 1, wherein the fastening member is configured to be fastened with the insert member.

5. The fiber reinforced resin molded article according to claim 1,
   wherein
   the functional site is thicker than the fiber reinforced resin layer.

* * * * *